(12) United States Patent
Staerzl

(10) Patent No.: US 7,131,877 B1
(45) Date of Patent: Nov. 7, 2006

(54) METHOD FOR PROTECTING A MARINE PROPULSION SYSTEM

(75) Inventor: Richard E. Staerzl, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 24 days.

(21) Appl. No.: 10/807,661

(22) Filed: Mar. 24, 2004

(51) Int. Cl.
*B63H 20/32* (2006.01)

(52) U.S. Cl. ......................................... 440/76; 205/727

(58) Field of Classification Search ................ 114/343, 114/222; 440/76, 77; 204/196.05, 196.36; 205/728, 729
See application file for complete search history.

(56) References Cited

U.S. PATENT DOCUMENTS

| | | | |
|---|---|---|---|
| 3,953,742 A | 4/1976 | Anderson et al. ............. 307/95 |
| 4,322,633 A | 3/1982 | Staerzl ......................... 307/95 |
| 4,492,877 A | 1/1985 | Staerzl ......................... 307/95 |
| 4,528,460 A | 7/1985 | Staerzl ......................... 307/95 |
| 4,604,068 A * | 8/1986 | Guinn .......................... 440/76 |
| 4,872,860 A | 10/1989 | Meisenburg ................ 440/113 |
| 5,342,228 A | 8/1994 | Magee et al. ................. 440/76 |
| 5,431,795 A * | 7/1995 | Moreland et al. ........... 252/503 |
| 5,636,587 A * | 6/1997 | Klimowicz ................. 114/259 |
| 5,716,248 A * | 2/1998 | Nakamura .................... 440/76 |
| 6,173,669 B1 | 1/2001 | Staerzl ....................... 114/222 |
| 6,183,625 B1 | 2/2001 | Staerzl ....................... 205/727 |
| 6,197,168 B1 * | 3/2001 | Matsunaga et al. .... 204/196.01 |
| 6,209,472 B1 | 4/2001 | Staerzl ....................... 114/222 |
| 6,514,401 B1 | 2/2003 | Chyou et al. ............... 205/739 |
| 6,547,952 B1 | 4/2003 | Staerzl ....................... 205/724 |
| 6,562,206 B1 * | 5/2003 | Showcatally ................ 204/280 |

* cited by examiner

*Primary Examiner*—Ed Swinehart
(74) *Attorney, Agent, or Firm*—William D. Lanyi

(57) ABSTRACT

An electrically conductive coating is provided on a housing structure of a marine propulsion system. By impressing a current on the electrically conductive coating, which can be a polymer material, the housing structure is used as an anode in a cathodic protection system. In addition, the use of the electrically conductive coating on the housing structure as an anode inhibits the growth of marine fouling on the outer surface of the housing structure by forming chlorine gas in a saltwater environment and by forming an acidic water layer near the surface in a non-saltwater environment.

34 Claims, 3 Drawing Sheets

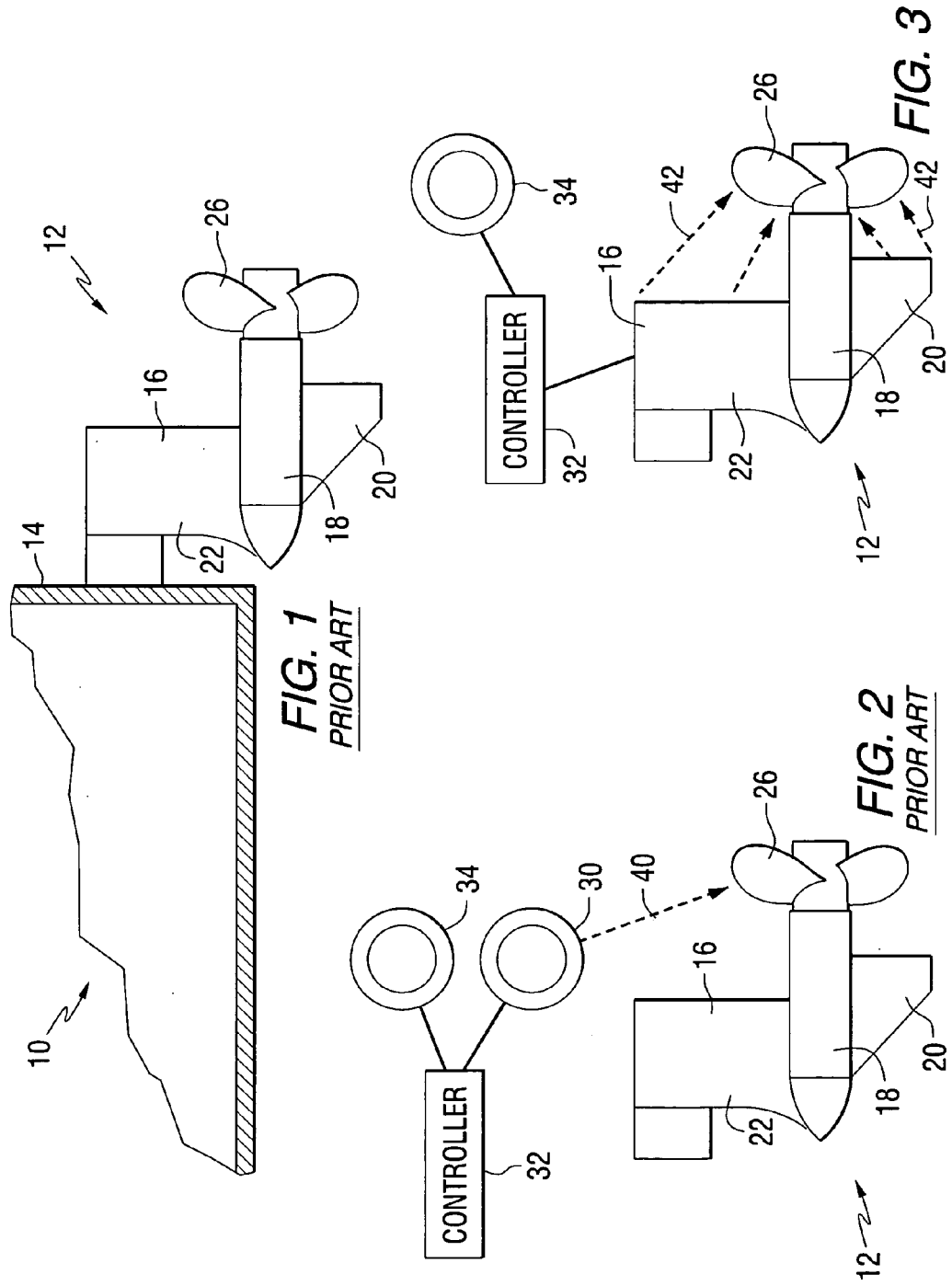

METHOD FOR PROTECTING A MARINE PROPULSION SYSTEM

BACKGROUND OF THE INVENTION

1. Field of the Invention

The present invention is generally related to a method for protecting a marine propulsion system and, more particularly, to a method which inhibits galvanic corrosion from damaging a marine propulsion system and, in addition, inhibits the growth of marine organisms on certain surfaces of the marine propulsion system.

2. Description of the Prior Art

Those skilled in the art of marine propulsion systems are aware of several problems that can adversely affect the enjoyment of owning and operating a marine vessel. One problem concerns the deleterious effects caused by galvanic circuits that can occur when different metals are submerged proximate each other in a water environment. This problem is exacerbated when the marine propulsion system is used in saltwater. Another problem relating to the operation of marine vessels is the growth of marine organisms on submerged surfaces of both the marine propulsion system and the vessel itself. In seawater, these organisms include many different types of organisms, including barnacles. In non-saltwater applications, the organisms can comprise algae and zebra mussels.

Many different techniques and procedures have been developed to address both the problem of galvanic corrosion and marine fouling.

U.S. Pat. No. 3,953,742, which issued to Anderson et al. on Apr. 27, 1976, discloses a cathodic protection monitoring apparatus for a marine propulsion device. The system monitor is coupled to an impressed current cathodic protection circuit used for corrosion protection of a submerged marine drive. The cathodic protection circuit includes one or more anodes and a reference electrode mounted below the water line and connected to an automatic controller for supplying an anode current which is regulated in order to maintain a predetermined reference potential on the protected structure. A switch selectively connects a light emitting diode lamp or other light source between the controller output and ground so that the controller current may, when tested, be used to operate the light source in order to confirm that power is available to the anode.

U.S. Pat. No. 4,322,633, which issued to Staerzl on Mar. 30, 1982, discloses a marine cathodic protection system. The system maintains a submerged portion of a marine drive unit at a selected potential to reduce or eliminate corrosion thereto. An anode is energized to maintain the drive unit at a preselected constant potential in response to the sensed potential at a closely located reference electrode during normal operations. Excessive current to the anode is sensed to provide a maximum current limitation. An integrated circuit employs a highly regulated voltage source to establish precise control of the anode energization.

U.S. Pat. No. 4,492,877, which issued to Staerzl on Jan. 8, 1985, discloses an electrode apparatus for cathodic protection. The apparatus is provided for mounting an anode and reference electrode of a cathodic protection system on an outboard drive unit. The apparatus includes an insulating housing on which the anode and reference electrode are mounted and a copper shield mounted between the anode and electrode to allow them to be mounted in close proximity to each other. The shield is electrically connected to the device to be protected and served to match the electrical field potential at the reference electrode to that of a point on the outboard drive unit remote from the housing.

U.S. Pat. No. 4,528,460, which issued to Staerzl on Jul. 9, 1985, disclosed a cathodic protection controller. The control system for cathodically protecting an outboard drive unit from corrosion includes an anode and a reference electrode mounted on the drive unit. Current supplied to the anode is controlled by a transistor, which in turn is controlled by an amplifier. The amplifier is biased to maintain a relatively constant potential on the drive unit when operated in either fresh or salt water.

U.S. Pat. No. 4,872,860, which issued to Meisenburg on Oct. 10, 1989, discloses a sacrificial anode for marine propulsion units. It is disposed in association with the trim cylinder unit of a marine propulsion device and is positioned in the previously unused area between the aft cylinder end and the rodeye or the like on the piston rod end. More specifically, the anode is in the form of an elongated generally cylindrical member of a diameter approximately that of the trim cylinder to provide improved mass characteristics, and is deeply grooved to thus provide ribs which enhance the working surface area.

U.S. Pat. No. 5,342,228, which issued to Magee et al. on Aug. 30, 1994, discloses a marine drive anode. The drive is provided with a large volume anode for galvanic protection. The anode is a brick-like block member tapered along each of its height, width, and length dimensions.

U.S. Pat. No. 6,173,669, which issued to Staerzl on Jan. 16, 2001, discloses an apparatus and method for inhibiting fouling of an underwater surface. The fouling prevention system comprises two conductive surfaces and a device that alternates the direction of electric current between the two surfaces. The current is caused to flow through seawater in which the two surfaces are submerged or partially submerged. A monitor measures the current flowing from one of the two conductive surfaces and compares it to the current flowing into the other conductive surface to assure that no leakage of current of substantial quantity exists.

U.S. Pat. No. 6,183,625, which issued to Staerzl on Feb. 6, 2001, discloses a marine galvanic protection monitor. The system uses two annunciators, such like light emitting diodes, to alert a boat operator of the current status of the boat's galvanic protection system. A reference electrode is used to monitor the voltage potential at a location in the water and near the component to be protected. The voltage potential of the electrode is compared to upper and lower limits to determine if the actual sensed voltage potential is above the lower limit and below the upper limit. The two annunciator lights are used to inform the operator if the protection is proper or if the component to be protected is either being overprotected or underprotected.

U.S. Pat. No. 6,209,472, which issued to Staerzl on Apr. 3, 2001, discloses an apparatus and method for inhibiting fouling of an underwater surface. The system for inhibiting marine organism growth on underwater surfaces provides an electric current generator which causes an electric current to flow proximate the underwater surface. A source of power, such as a battery, provides electrical power to the electric current generator. The flow of current passes from the underwater surface through the water surrounding the surface or in contact with the surface, and a point, of ground potential. The point of ground potential can be a marine propulsion system attached to a boat on which the underwater surface is contained.

U.S. Pat. No. 6,547,952, which issued to Staerzl on Apr. 15, 2003, discloses a system for inhibiting fouling of an underwater surface. An electrically conductive surface is combined with a protective surface of glass in order to provide an anode from which electrons can be transferred to seawater for the purpose of generating gaseous chlorine on the surface to be protected. Ambient temperature cure glass (ATC glass) provides a covalent bond on an electrically conductive surface, such as nickel-bearing paint.

U.S. patent application Ser. No. 10/632,056, (M09691), which was filed on Jul. 31, 2003 by Staerzl et al., discloses a submersible anode made of a resin matrix with a conductive powder supported therein. An anode for a cathodic protection system comprises a base portion or support structure which is shaped to receive a conductive element, or insert, within a cavity of the support structure. The conductive element is made of a polymer material, such as vinyl esther, with a conductive filler, such as graphite powder. The base is attachable to a marine vessel or other submersible component that is being protected by a cathodic protection system. The anode allows the use of a relatively inexpensive resin material with a graphite filler in place of a much more expensive platinum coated titanium element.

U.S. patent application Ser. No. 10/780,342, (M09719), which was filed on Feb. 17, 2004 by Misorski et al., discloses a marine drive unit which is overmolded with a polymer material. A marine propulsion system drive unit is provided with a polymer layer to protect its outer surface from abrasion and corrosion. The polymer layer is injection molded around the outer surface of a metallic gear case structure or drive shaft housing to provide a coat which is approximately three millimeters thick and which will resist scratching and corrosion. The polymer layer can be a glass filled polymer or a carbon filled polymer. An adhesion promoter can be used to enhance the bonding and intimate contact between the inner surface of the polymer layer and the outer surface of the metallic gear case structure or drive shaft housing.

The patents described above are hereby expressly incorporated by reference in the description of the present invention.

It would be significantly beneficial if a system could be provided which enhances the operation of a cathodic protection system by enlarging the size of the anode. It would be particularly beneficial if this size expansion could be achieved without the necessity of attaching relatively large components to the transom of a marine vessel in place of the normal anode used in most commercially available cathodic protection systems. It would also be beneficial if a system could be provided to protect the drive unit of a marine propulsion system from marine fouling in both saltwater and non-saltwater environments.

SUMMARY OF THE INVENTION

A method for protecting a marine propulsion system, in accordance with a preferred embodiment of the present invention, comprises the steps of providing a source of electrical power and causing a housing structure of the marine propulsion system to act as an anode in a galvanic circuit which comprises the housing structure, a metallic component, and the water in which the housing structure and metallic component are at least partially submerged.

The present invention can further comprise the step of inducing the metallic component to act as a cathode in the galvanic circuit. The metallic component, in a preferred embodiment of the present invention, is a propeller of the marine propulsion system. The causing step can comprise the step of providing an electrically conductive coating on a surface of the housing structure which is submerged during operation of the marine propulsion system. The electrically conductive coating can be made of a polymer material that is a matrix in which an electrically conductive material is disposed. The electrically conductive material can comprise graphite fibers. An electrically insulative layer can be disposed between the housing structure and the electrically conductive coating if the housing structure is electrically conductive.

In a particularly preferred embodiment of the present invention, it further comprises the step of impressing an electric current on the electrically conductive coating. This step can be accompanied by a further step of measuring a voltage at a preselected distance from the housing structure to determine the effectiveness of the causing step and intermittently ceasing the causing step as a function of the voltage in order to regulate the voltage to a predetermine range of magnitudes.

In certain embodiments of the present invention, it comprises the steps of providing a housing structure for the marine propulsion system and disposing an electrically conductive coating on at least a portion of the surface of the housing structure of the marine propulsion system, wherein the electrically conductive coating is connectable in electrical communication with a source of electrical power. It also comprises the steps of providing the source of electrical power and connecting the source of electrical power in electrical communication with the electrically conductive coating.

A preferred embodiment of the present invention further comprises the steps of providing a metallic component, such as a propeller, and causing the electrically conductive coating on the housing structure to act as an anode in a galvanic circuit which comprises the electrically conductive coating, the metallic component, and the water in which the electrically conductive coating and the metallic component are at least partially submerged. In this way, the metallic component acts as a cathode in the galvanic circuit. The electrically conductive coating is made of a polymer material which is a matrix in which an electrically conductive material is disposed.

BRIEF DESCRIPTION OF THE DRAWINGS

The present invention will be more fully and completely understood from a reading of the description of the preferred embodiment in conjunction with the drawings, in which:

FIGS. 1 and 2 show how a cathodic protection system is used in conjunction with a marine propulsion system;

FIG. 3 is a simplified schematic representation of the present invention;

DESCRIPTION OF THE PREFERRED EMBODIMENT

Figure 4:
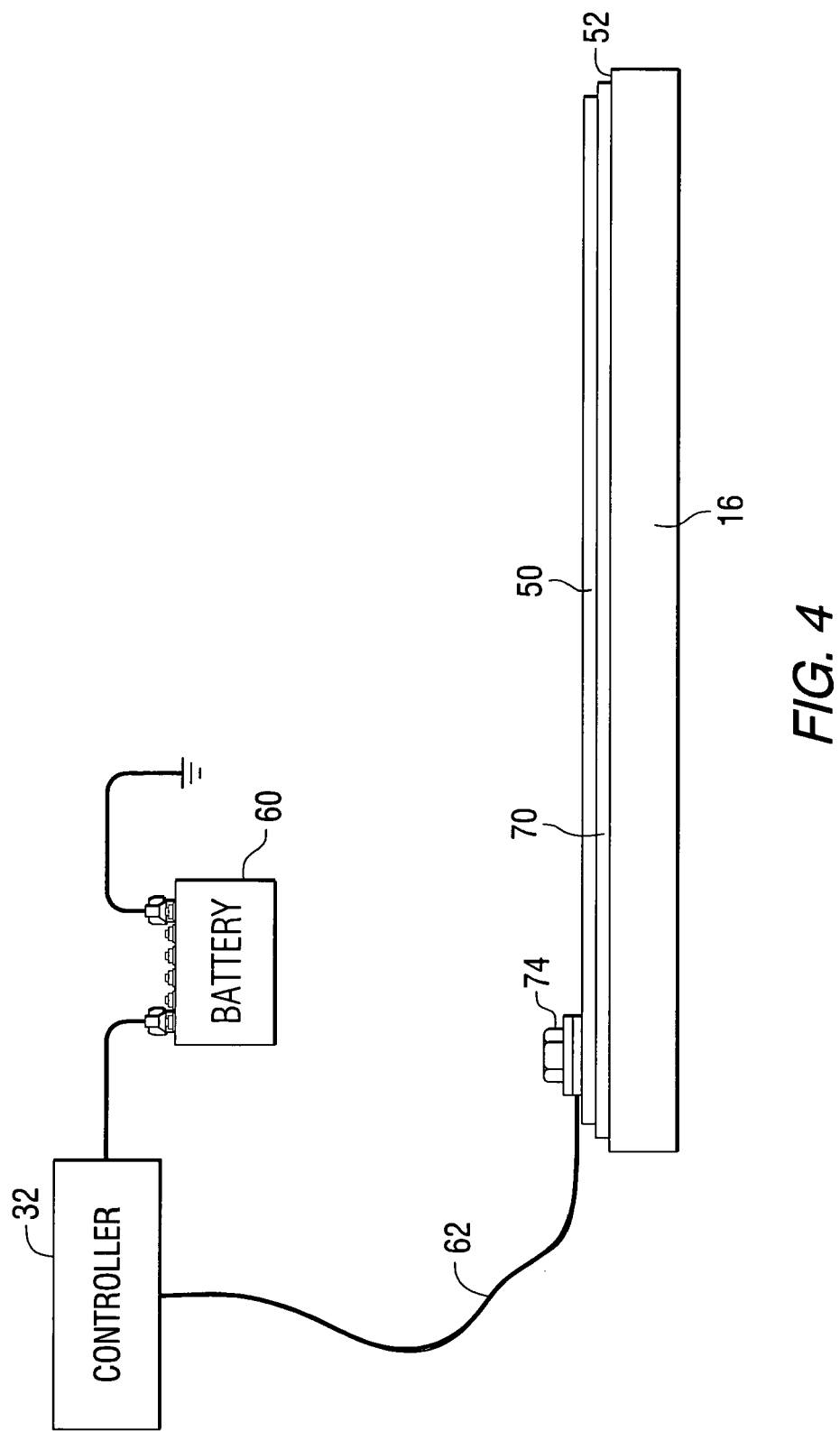
FIG. 4 shows a controller and a power source connected to an electrically conductive coating on a housing structure.

Throughout the description of the preferred embodiment of the present invention, like components will be identified by like: reference numerals.

FIG. 1 illustrates a marine vessel 10 with a sterndrive marine propulsion system 12 attached to its transom 14. Sterndrive systems are well known to those skilled in the art. The marine propulsion system 12 comprises a housing 16 which includes a gear case 18, a skeg 20, a drive shaft housing 22 and a propeller 26 that is supported for rotation about a generally horizontal propeller axis by a propeller shaft which is connected in torque transmitting relation with the drive shaft enclosed within the housing 16.

U.S. Pat. No. 4,322,633, which is described above, provides a detailed explanation of the way in which a marine cathodic protection system is used to provide an anode that inhibits galvanic corrosion of the housing structure 16 and other components. As described in U.S. Pat. No. 4,322,633, a reference electrode is used to measure the effectiveness of the cathodic protection system.

FIG. 2 schematically represents a cathodic protection system such as the systems described in U.S. Pat. Nos. 4,322,633 and 4,492,877. In addition, cathodic protection systems are also described in detail in U.S. Pat. Nos. 4,528,460 and 3,953,742.

The purpose of the schematic representation in FIG. 2 is to allow the present invention to be later compared to the known methods of providing a cathodic protection system. In FIG. 2, the marine propulsion system 12 is protected by an anode 30 which is, in turn, controlled by a controller 32 that uses a reference electrode 34 to measure the effectiveness of the anode 30 with respect to the housing structure 16 of the marine propulsion system 12. In a galvanic circuit, the propeller 26 serves as a cathode when an electron current flows from the anode 30 to a source of power which is usually a battery that is under the control of the controller 32. By impressing a current in this way, galvanic corrosion can be significantly reduced. The controller 32 shown in FIG. 2 can be a system that incorporates a monitor such as the monitor described in U.S. Pat. No. 6,183,625.

As illustrated in U.S. Pat. No. 4,322,633, the anode 30 and the reference electrode 34 are typically attached to the transom, such as the transom 14 illustrated in FIG. 1. They are placed at a preselected distance from the component which is to be protected, such as the housing structure 16 of the marine propulsion system 1.2.

Certain marine propulsion systems are inherently subject to more vigorous attack through the operation of galvanic corrosion. As an example, certain marine propulsion systems use either very large propellers 26 or two counter-rotating propellers. When the propeller, which is typically made of stainless steel, has a relatively large surface area, it serves as a particularly effective cathode. If the operation of the anode 30 is insufficient or if the anode 30 is too small to counteract the effect of the large propeller cathode, damage to the housing structure 16 can occur. It would therefore be significantly beneficial if a system, such as that shown in FIG. 2 and described in the patent identified above, could be adapted to increase the effectiveness of the anode in the cathodic protection system.

FIG. 3 illustrates a preferred embodiment of the present invention. It is intentionally simplified so that the basic concept of the present invention can more clearly be described. The controller 32, and its source of electrical power, is connected in electrical communication with the housing structure 16 of the marine propulsion system 12. The outer surface of the housing structure 16 is coated with an electrically conductive coating which will be described in greater detail below. This electrically conductive coating replaces the standard anode 30 described above in conjunction with FIG. 2. Instead of using an anode 30 which is attached to the transom of a marine vessel, the electrically conductive coating is used as an anode with a much increased surface area. This enhances the effectiveness of the cathodic protection system.

As in the examples described above, the propeller 26 is induced to act as a cathode while the coating of the housing structure 16 is induced to act as the anode in place of the standard anode 30 described above.

With reference to FIGS. 2 and 3, dashed line 40 in FIG. 2 represents the ionic current flow through the water in which the anode 30 and the housing structure 16 are at least partially submerged. In a system such as that illustrated in FIG. 2, the housing structure 16 is typically painted. In FIG. 3, the dashed lines 42 represent the current flow when the surface of the housing structure 16 is used as the anode.

The electrically conductive coating in a preferred embodiment of the present invention comprises a polymer material that serves as a matrix in which a conductive powder, fibers or particulates are suspended. These conductive materials can be graphite powder or other conductive materials. Conductive polymers are available commercially for use in various applications, such as fuel cells. One material that is suitable for these purposes is sold under the name Pemtex and is commercially available. Alternative materials are also available for use for these purposes. The necessary characteristic is that the material be sufficiently electrically conductive to serve the purposes described herein and be of a nature that is conducive to allowing the material to be used as a coating on the outer surfaces of the housing structure. It has been found that a polymer material of this general type can be disposed on the drive housing by an overmolding process. A suitable process for molding the electrically conductive coating to the housing structure is described in the patent application of Misorski et al. which is described above. However, the overmolded coating used in the present invention is electrically conductive, whereas the overmolded material described in the Misorski et al. patent application is not necessarily electrically conductive, but is used to provided a rugged protective coating for the drive shaft housing or gear case.

FIG. 4 illustrates an electrically conductive coating 50 deposited or overmolded on the outer surface 52 of the housing structure 16 of the marine propulsion system 12 described above in conjunction with FIG. 3. FIG. 4 shows the controller 32 connected to a battery 60 which serves as the source of electrical power. The controller is connected to the electrically conductive coating 52 by an appropriate conductor 62 which is connected in electrical communication with the electrically conductive coating 50. Between the electrically conductive coating 50 and the surface 52 of the housing structure 16 is an insulative layer 70 which serves to insulate the electrically conductive coating 50 from the housing structure 16. This is particularly necessary if the housing structure 16 is electrically conductive. Although the electrical connection between the conductor 62 and the electrically conductive coating is schematically represented as a bolt 74 in FIG. 4, it should be understood that many other types of electrical connection between these various components is possible within the scope of the present invention. In addition, although the housing structure 16 is represented as a relatively flat plate in FIG. 4, it should be understood that the outer surface of the housing structure 16 is typically contoured to form an appropriate hydrodynamic shape.

Figure 5:
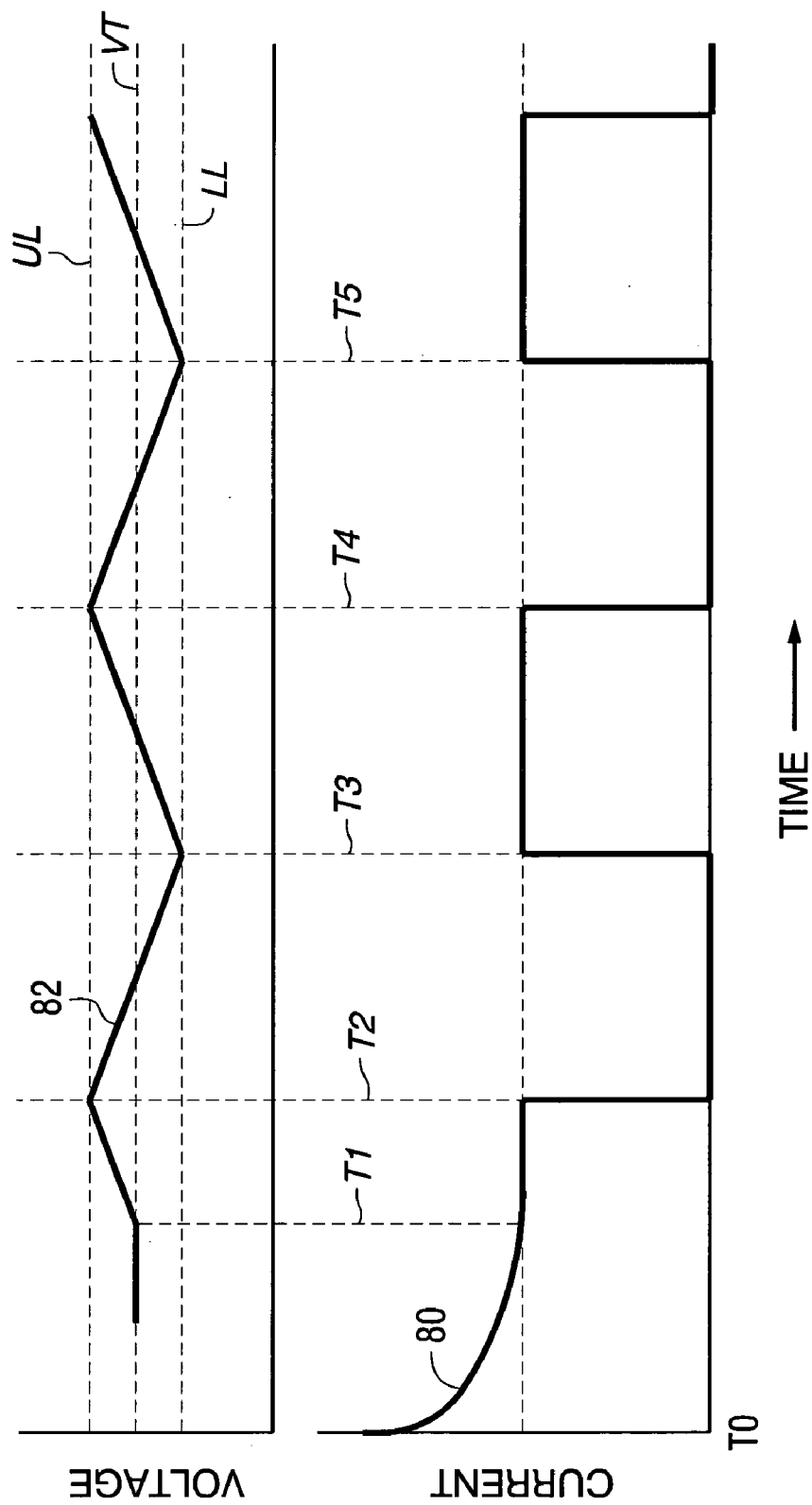
FIG. 5 is a graphic representation of the changes in an impressed current and resulting voltage that occur through the use of the present invention.

FIG. 5 is a time-based graphical representation of the impressed anode current 80 and the measured reference voltage 82 that is measured by the reference electrode 34 described above in conjunction with FIGS. 2 and 3. Beginning at time T0, the impressed current is provided to the anode until it becomes polarized. Then, at time T1, continued impressing of the current 80 causes the voltage 82 to begin to rise above a target voltage VT. When the reference voltage 82 reaches an upper limit UL, the impressed current is turned off by the controller 32 at time T2. This then allows the voltage 82 to dissipate from time T2 to time T3. When the voltage 82 reaches a lower limit LL, the current 80 is again initiated to raise the voltage 82. This occurs between time T3 and time T4 when the current 80 is again terminated because the voltage 82 reaches the upper limit UL. This cycle continues as long as the system is operative. As a result, the voltage 82 is maintained between the lower limit LL and the upper limit UL. These limits are selected to provide ample cathodic protection to the housing structure 16. Each time the voltage 82 reaches the upper limit UL, such as at times T2 and T4, the current 80 is terminated. When the voltage 82 reaches the lower limit LL, such as at times T3 and T5, the anode current 80 is reinitiated.

It should be understood that the present invention simultaneously provides two significant beneficial results. First, by acting as a cathodic protection system, the present invention inhibits galvanic corrosion. This occurs even with relatively large propellers 26 or in dual propeller application where the surface area of stainless steel propellers are relatively large. The ability of the present invention to provide cathodic protection under these circumstances results from the fact that the anode surface area is significantly enlarged. Rather than providing a limited anode area, such as the anode 30 shown in FIG. 2, the present invention provides a much larger surface area on the outer surface of the housing structure 16. Simultaneously, the use of the outer surface of the housing structure 16 as an anode inhibits marine fouling on that surface. If the marine propulsion system is used in a saltwater application, chlorine gas is produced at the surface of the housing structure and this chlorine gas discourages the growth of marine organisms. If the marine propulsion system is used in non-saltwater applications, a slightly acidic region is caused to exist immediately proximate the surface of the drive housing. This increased acidity discourages the growth of algae and other organisms.

With reference to FIGS. 1–5, it can be seen that the present invention provides a source of electrical power, such as the battery 60. It also causes a housing structure 16 of the marine propulsion system 12 to act as an anode in a galvanic circuit which comprises the housing structure 16, a metallic component 26, and water in which the housing structure and the metallic component are at least partially submerged. The present invention induces the metallic component, such as a propeller, to act as a cathode in the galvanic circuit. The causing step of the present invention comprises the step of providing an electrically conductive coating 50 on a surface 52 of the housing structure 16 which is submerged during operation of the marine propulsion system 12. The electrically conductive coating 50 can be a polymer material which acts as a matrix in which electrically conductive material, such as graphite fiber, is disposed. An insulative layer 70 can be disposed between the housing structure 16 and the electrically conductive coating 50. The present invention comprises the step of impressing a current 80 on the electrically conductive coating 50. It also comprises the step of measuring a voltage 82 at a preselected distance from the housing structure 16 to determine the effectiveness of the causing step. It also comprises the step of intermittently ceasing the causing step, as shown in FIG. 5, as a function of the voltage 82 to regulate the voltage to a predetermined range of magnitudes. When at least partially submerged in saltwater, chlorine gas is formed on an exposed surface of the housing structure 16. When at least partially submerged in non-saltwater, the local pH of the non-saltwater near the surface of the conductive coating is decreased.

Although the present invention has been described in particular detail and illustrated to show a preferred embodiment, it should be understood that alternative embodiments are also within its scope.

I claim:

1. A method for protecting a marine propulsion system, comprising the steps of:

providing a source of electrical power;

causing a housing structure of said marine propulsion system to act as an anode in a galvanic circuit which comprises said housing structure, a metallic component, and water in which said housing structure and said metallic component are at least partially submerged, said housing structure of said marine propulsion system being adapted to be mounted for support on a transom of a marine vessel and including a driveshaft housing extending downwardly to a gear case, a driveshaft in said driveshaft housing being connected in torque transmitting relation with a propeller shaft in said gear case for rotating a propeller;

ohmically connecting said anode to said source of electrical power and directing unidirectional nonalternating current flow through said galvanic circuit.

2. The method of claim 1, further comprising:

inducing said metallic component to act as a cathode in said galvanic circuit.

3. The method of claim 1, wherein:

said metallic component is said propeller.

4. The method of claim 1, wherein:

said causing step comprises the step of providing an electrically conductive coating on a surface of said housing structure which is submerged during operation of said marine propulsion system, and comprising ohmically connecting said electrically conductive coating to said source of electrical power.

5. The method of claim 4, wherein:

said electrically conductive coating is made of a polymer material.

6. The method of claim 5, wherein:

said polymer material is a matrix in which an electrically conductive material is disposed.

7. The method of claim 6, wherein:

said electrically conductive material comprises graphite fibers.

8. The method of claim 4, further comprising:

disposing an electrically insulative layer between said housing structure and said electrically conductive coating.

9. The method of claim 4, further comprising:

impressing a current on said electrically conductive coating from said source of electrical power through the ohmic connection of said source of electrical power to said electrically conductive coating.

10. The method of claim 9, further comprising:

sensing a voltage at a preselected distance from said housing structure to determine the effectiveness of said causing step.

11. The method of claim 10, further comprising;
intermittently ceasing said causing step as a function of said voltage to regulate said voltage to a predetermined range of magnitudes.

12. The method of claim 10, wherein:
said housing structure is at least partially submerged in saltwater; and
chlorine gas is formed on an exposed surface of said housing structure.

13. The method of claim 10, wherein:
said housing structure is at least partially submerged in non-saltwater; and
the local ph of said non-saltwater is decreased in the region immediately proximate an exposed surface of said housing structure.

14. A method for protecting a marine propulsion system, comprising the steps of:
providing a housing structure for said marine propulsion system, said housing structure of said marine propulsion system being adapted to be mounted for support on a transom of a marine vessel and including a driveshaft housing extending downwardly to a gear case, a driveshaft in said driveshaft housing being connected in torque transmitting relation with a propeller shaft in said gear case for rotating a propeller;
disposing an electrically conductive coating on at least a portion of the surface of said housing structure of said marine propulsion system, said coating acting as an anode in a galvanic circuit which comprises said coating, a metallic component, and water in which said housing and said metallic component are at least partially submerged;
ohmically connecting said electrically conductive coating to a source of electrical power and directing unidirectional nonalternating current flow through said galvanic circuit.

15. The method of claim 14, further comprising:
providing an electrically insulated layer between said housing structure and said electrically conductive coating, providing an ohmic circuit between said source of electrical power and said electrically conductive coating, and providing said galvanic circuit between said electrically conductive coating and said metallic component of said marine propulsion system.

16. The method of claim 14, further comprising:
inducing said metallic component to act as a cathode in said galvanic circuit.

17. The method of claim 16, wherein:
said metallic component is said propeller.

18. The method of claim 17, wherein:
said electrically conductive coating is made of a polymer material.

19. The method of claim 18, wherein:
said polymer material is a matrix in which an electrically conductive material is disposed.

20. The method of claim 19, wherein:
said electrically conductive material comprises graphite fibers.

21. The method of claim 19, further comprising:
disposing an electrically insulative layer between said housing structure and said electrically conductive coating.

22. The method of claim 19, further comprising:
impressing a current on said electrically conductive coating from said source of electrical power through the ohmic connection between said source of electrical power and said electrically conductive coating.

23. The method of claim 22, further comprising:
sensing a voltage at a preselected distance from said housing structure to determine the effectiveness of said causing step.

24. The method of claim 23, further comprising:
intermittently ceasing said causing step as a function of said voltage to regulate said voltage to a predetermined range of magnitudes.

25. The method of claim 23, wherein:
said housing structure is at least partially submerged in saltwater; and
chlorine gas is formed on an exposed surface of said housing structure.

26. The method of claim 23, wherein:
said housing structure is at least partially submerged in non-saltwater; and
the local pH of said non-saltwater is decreased in the region immediately proximate an exposed surface of said housing structure.

27. A method for protecting a marine propulsion system, comprising the steps of:
providing a housing structure for said marine propulsion system, said housing structure of said marine propulsion system being adapted to be mounted for support on a transom of a marine vessel and including a driveshaft housing extending downwardly to a gear case, a driveshaft in said driveshaft housing being connected in torque transmitting relation with a propeller shaft in said gear case for rotating a propeller;
disposing an electrically conductive coating on at least a portion of the surface of said housing structure of said marine propulsion system, said coating acting as an anode in a galvanic circuit which comprises said coating, a metallic component, and water in which said housing structure and said metallic component are at least partially submerged;
providing a source of electrical power; and
ohmically connecting said source of electrical power to said electrically conductive coating and directing unidirectional nonalternating current flow through said galvanic circuit.

28. The method of claim 27, further comprising:
inducing said metallic component to act as a cathode in said galvanic circuit.

29. The method of claim 28, wherein:
said metallic component is a propeller of said marine propulsion system.

30. The method of claim 29, wherein:
said electrically conductive coating is made of a polymer material which is a matrix in which an electrically conductive material is disposed.

31. The method of claim 30, further comprising:

disposing an electrically insulative layer between said housing structure and said electrically conductive coating.

32. The method of claim 31, further comprising:

impressing a current on said electrically conductive coating from said source of electrical power through the ohmic connection between said source of electrical power and said electrically conductive coating;

sensing a voltage at a preselected distance from said housing structure to determine the effectiveness of said causing step.

33. The method of claim 32, further comprising:

intermittently ceasing said causing step as a function of said voltage to regulate said voltage to a predetermined range of magnitudes.

34. The method of claim 33, wherein:

said housing structure is at least partially submerged in saltwater; and chlorine gas is formed on an exposed surface of said housing structure.

* * * * *